(12) United States Patent
Shen

(10) Patent No.: US 11,208,065 B2
(45) Date of Patent: Dec. 28, 2021

(54) VEHICLE BUMPER SUPPORT ASSEMBLIES

(71) Applicant: Toyota Motor Engineering & Manufacturing North America, Inc., Plano, TX (US)

(72) Inventor: Mingher Fred Shen, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 113 days.

(21) Appl. No.: 16/810,239

(22) Filed: Mar. 5, 2020

(65) Prior Publication Data
US 2021/0276505 A1    Sep. 9, 2021

(51) Int. Cl.
*B60R 19/52*     (2006.01)
*B60R 19/24*     (2006.01)

(52) U.S. Cl.
CPC .............. *B60R 19/52* (2013.01); *B60R 19/24* (2013.01); *B60R 2019/527* (2013.01)

(58) Field of Classification Search
CPC .... B60R 19/52; B60R 19/24; B60R 2019/527
See application file for complete search history.

(56) References Cited

U.S. PATENT DOCUMENTS

| | | |
|---|---|---|
| 6,481,690 B2 | 11/2002 | Kariatsumari et al. |
| 6,884,025 B2 | 4/2005 | Pickens et al. |
| 7,976,082 B2 | 7/2011 | Song |
| 7,980,615 B2 | 7/2011 | Hashimoto et al. |
| 8,109,546 B2 | 2/2012 | Schelberg et al. |

FOREIGN PATENT DOCUMENTS

| | | |
|---|---|---|
| JP | 2005280666 A | 10/2005 |
| KR | 19990005062 A | 1/1999 |

OTHER PUBLICATIONS

Byeong-Same Kim and Whanju Lee, "Analysis of Crash Impact of Composites Stay-shaped Bumper Using FEM Method", Int'l Journal of Computing, Communications & Instrumentaion Engg., 2017, 6 pages, vol. 4, Issue 2, ISSN2349-1469 EISSN 2349-1477, http://iieng.org/images/proceedings_pdf/102.pdf.

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A vehicle is provided including a bumper attachment member, a radiator support beam, and a bumper support assembly coupled to the bumper attachment member and the radiator support beam. The bumper support assembly includes a center stay fixed to the radiator support beam and a center stay support having a receiver, an arm, and an anti-rotation pin. The arm extends in a vehicle-longitudinal direction from the receiver. The receiver is configured to receive and engage the bumper attachment member. The anti-rotation pin extends in the vehicle-lateral direction proximate an end of the arm opposite the receiver and engages the center stay to inhibit movement of the bumper attachment member with respect to the radiator support beam.

11 Claims, 2 Drawing Sheets

VEHICLE BUMPER SUPPORT ASSEMBLIES

TECHNICAL FIELD

The present specification generally relates to bumper retainers and bumper supports for vehicles and, more specifically, bumper retainers for vehicles to inhibit movement and sagging of vehicle bumpers with respect to a vehicle radiator.

BACKGROUND

Vehicles are equipped with bumper retainers or bumper supports to maintain the intended and original position of the bumper. Typical bumper retainers extend between the bumper and some other structure of the vehicle, such as the radiator. However, over time, these bumper retainers tend to rotate in a vehicle downward direction due to the weight of the bumper and the distance between the bumper and the radiator. This results in the bumper eventually moving in the downward direction and sagging, which is visibly noticeable.

Accordingly, a need exists for vehicle bumper retainers that inhibit movement, such as sagging, of vehicle bumpers with respect to the radiator of the vehicle.

SUMMARY

In one embodiment, a vehicle includes a bumper attachment member, a radiator support beam, and a bumper support assembly coupled to the bumper attachment member and the radiator support beam. The bumper support assembly includes a center stay fixed to the radiator support beam and a center stay support having a receiver, an arm, and an anti-rotation pin. The arm extends in a vehicle-longitudinal direction from the receiver. The receiver is configured to receive and engage the bumper attachment member. The anti-rotation pin extends in the vehicle-lateral direction proximate an end of the arm opposite the receiver and engages the center stay to inhibit movement of the bumper attachment member with respect to the radiator support beam.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper attachment member, a radiator support beam, and a bumper support assembly coupled to the bumper attachment member and the radiator support beam. The bumper support assembly includes a center stay fixed to the radiator support beam and a center stay support having a receiver, an arm extending in a vehicle-longitudinal direction from the receiver, and an anti-rotation pin. The receiver is configured to receive and engage the bumper attachment member. The anti-rotation pin extends in the vehicle-lateral direction proximate an end of the arm opposite the receiver and engages the center stay to inhibit movement of the bumper attachment member with respect to the radiator support beam.

In the embodiments described herein, the phrase "vehicle-longitudinal direction" refers to the forward-rearward direction (i.e., the +/−x direction of the coordinate axes in the figures). The phrase "vehicle-vertical direction" refers to the upward-downward direction (i.e., the +/−z direction of the coordinate axes in the figures). The phrase "vehicle-lateral direction" refers to the left-right direction (i.e., the +/−y direction of the coordinate axes in the figures).

Figure 1:
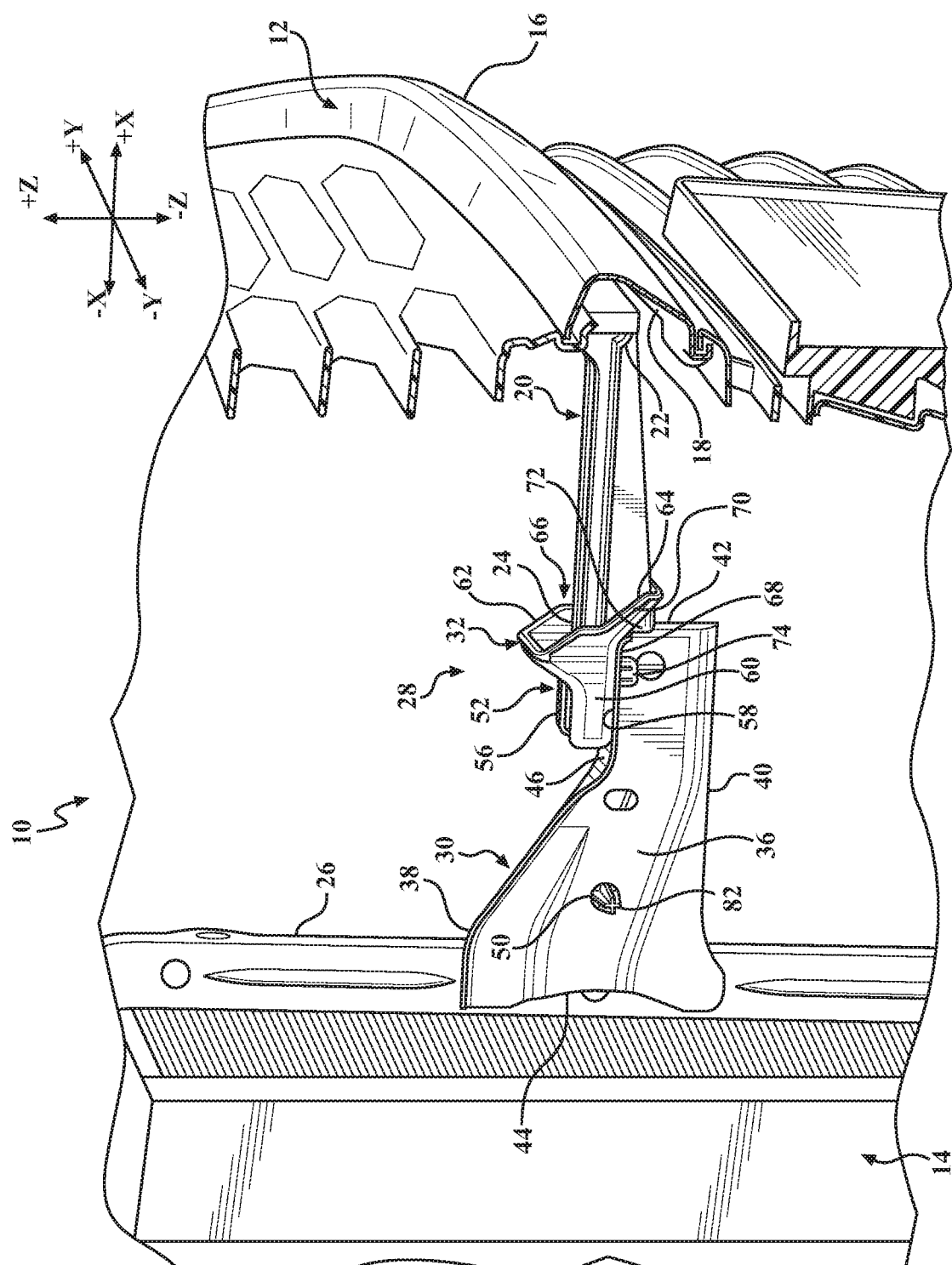
FIG. 1 schematically depicts a partial perspective cross-sectional view of a vehicle including a bumper support assembly extending between a bumper and a radiator according to one or more embodiments shown and described herein.

Referring to FIG. 1, a vehicle 10 includes a bumper 12 and a radiator 14. The bumper 12 extends in a vehicle-lateral direction of the vehicle 10 and has a forward surface 16 and a rear surface 18. A bumper attachment member 20 extends in the vehicle-longitudinal direction and has a forward end 22 and an opposite rear end 24. The forward end 22 of the bumper attachment member 20 is fixed to the rear surface 18 of the bumper 12 by any suitable means, such as mechanical fasteners, welding, or the like. The radiator 14 of the vehicle 10 includes a radiator support beam 26 extending in a vehicle-vertical direction. A bumper support assembly 28 couples the bumper 12 to the radiator 14 and, more particularly, the bumper attachment member 20 to the radiator support beam 26, to inhibit movement of the bumper 12 and to prevent the bumper 12 from sagging with respect to the rest of the vehicle, namely, the radiator 14. The bumper support assembly 28 includes a center stay 30 and a center stay support 32. The center stay 30 extends toward the bumper 12 and is fixed to the radiator support beam 26 by any suitable means, such as mechanical fasteners, welding, or the like. As discussed in more detail herein, the center stay support 32 engages both the center stay 30 and the bumper attachment member 20.

Figure 2:
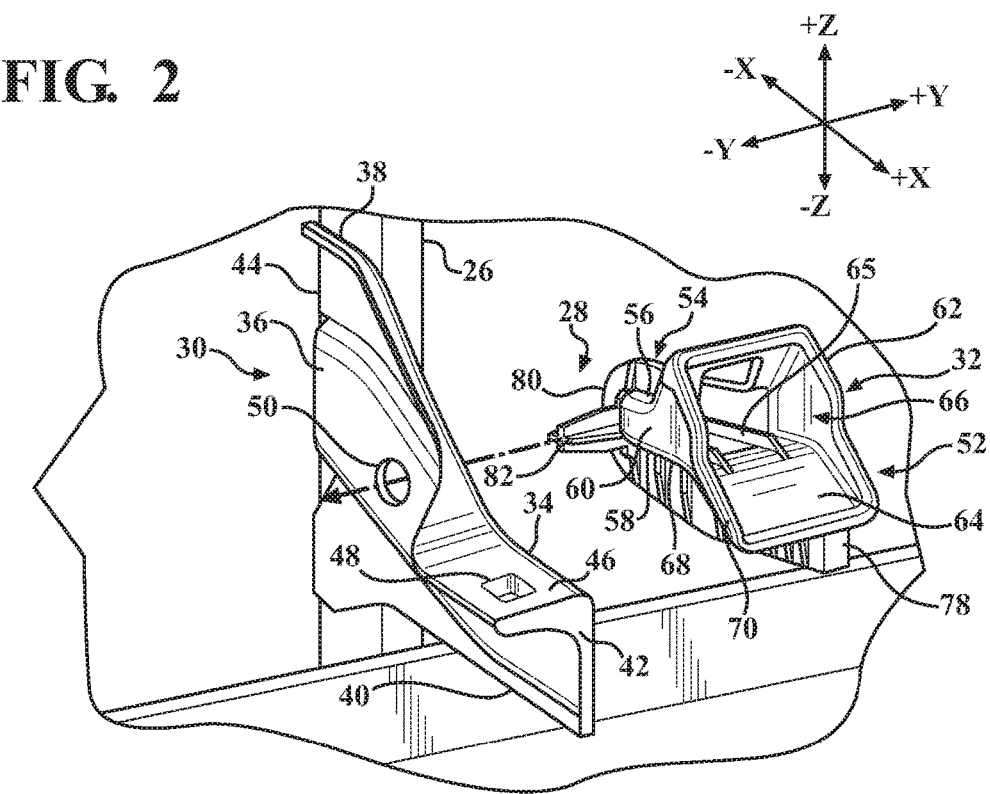
FIG. 2 schematically depicts an exploded view of the bumper support assembly according to one or more embodiments shown and described herein.

Referring now to FIGS. 1 and 2, the bumper support assembly 28 is shown disassembled and in relation to both the radiator support beam 26 and the bumper attachment member 20. The center stay 30 extends in the vehicle-longitudinal direction from the radiator support beam 26 and includes a first surface 34, an opposite second surface 36, an upper edge 38, an opposite lower edge 40, a forward edge 42, and an opposite rear edge 44. As shown, the second surface 36 of the center stay 30 is fixed to the radiator support beam 26 proximate the rear edge 44 thereof. As noted above, the center stay 30 may be fixed to the radiator support beam 26 in any suitable manner illustratively including fasteners, welding, or the like. In some embodiments, the center stay 30 may be fixed to the radiator support beam 26 on the first surface 34 of the center stay 30, as opposed to the opposite second surface 36.

The upper edge 38 of the center stay 30, or at least a portion thereof, is curved or bent to extend in the vehicle-lateral direction and define a ledge 46 on which the center stay support 32 sits. In some embodiments, a locking aperture 48 is formed in the ledge 46 of the center stay 30 proximate the forward edge 42 thereof. Due to the locking aperture 48 being formed in the ledge 46 of the center stay 30, the locking aperture 48 extends in the +/−z vehicle-vertical direction of the coordinate axes. Further, an anti-rotation aperture 50 is formed in the center stay 30 between the upper edge 38 and the lower edge 40. Due to the anti-rotation aperture 50 being formed through the first surface 34 and the second surface 36 of the center stay 30, the anti-rotation aperture 50 extends in the +/−y vehicle-lateral direction of the coordinate axes. As shown, the anti-rotation aperture 50 is formed at an approximately middle point between the upper edge 38 and the lower edge 40 of the center stay 30. However, the location of the anti-rotation aperture 50 may be moved in any direction based on the geometry of the center stay support 32.

The center stay 30 may be formed of any suitable material, such as metal, plastic, polymer composites, or the like. In some embodiments, the center stay 30 is a one-piece, monolithic structure. Thus, the center stay 30 may be formed in any suitable manner, such as casting, injection molding, or the like.

Figure 3:
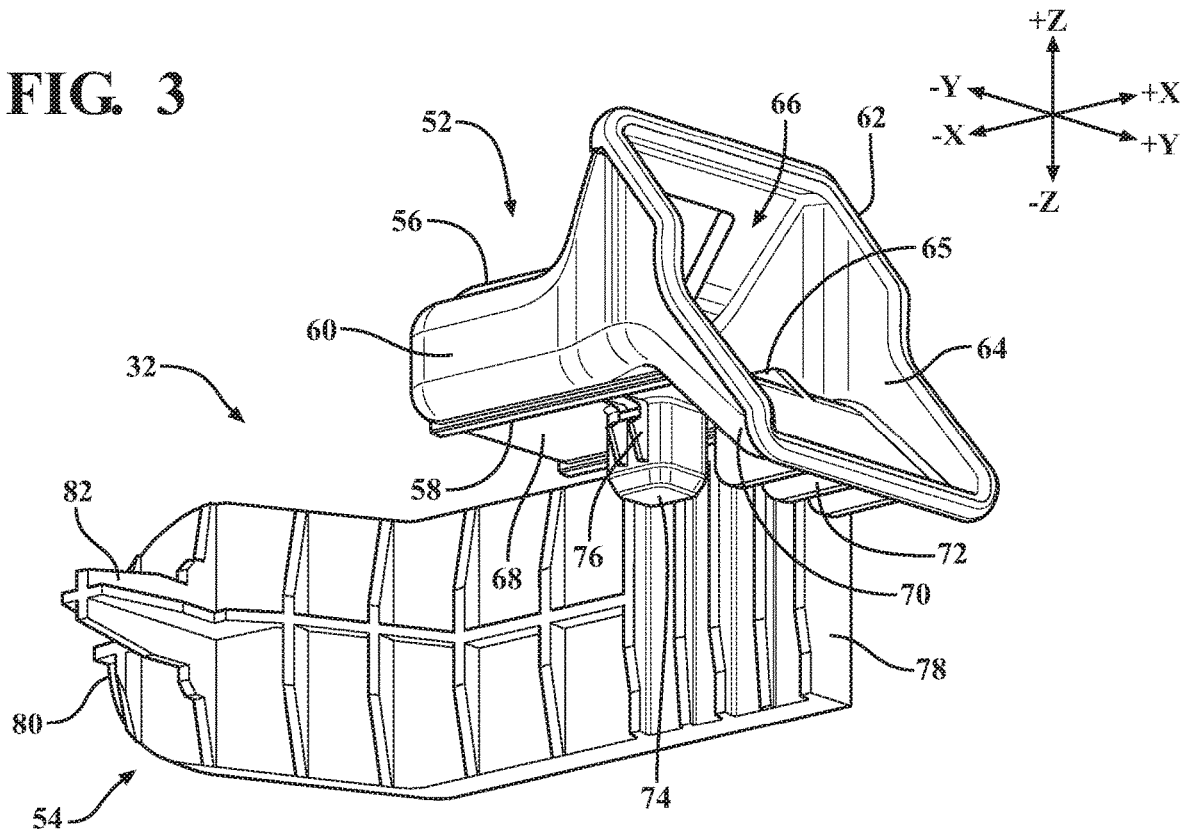
FIG. 3 schematically depicts a perspective view of a center stay support of the bumper support assembly according to one or more embodiments shown and described herein.

As shown in FIGS. 2 and 3, the center stay support 32 includes a receiver 52 and an arm 54. The receiver 52 has an upper surface 56, an opposite lower surface 58, a first side wall 60, and an opposite second side wall 62. The first side wall 60 and the second side wall 62 both extend between the upper surface 56 and the lower surface 58. The upper surface 56, the lower surface 58, the first side wall 60, and the second side wall 62 cooperate to define a channel 64 within the receiver 52 having an open front end 66 for receiving and engaging the rear end 24 of the bumper attachment member 20 through the open front end 66 of the receiver 52. The channel 64 includes any suitable geometry or structure to engage and mate with the rear end 24 of the bumper attachment member 20 opposite the bumper 12. For example, the channel 64 may include grooves 65, snaps, clips, or the like, which engage the rear end 24 of the bumper attachment member 20.

The lower surface 58 of the receiver 52 defines a seat 68 for seating on the ledge 46 of the center stay 30. The lower surface 58 of the receiver 52 further includes a sloped section 70 formed proximate the open front end 66 of the channel 64 and is angled downwardly in the −z vehicle-vertical direction, thereby increasing the size of the open front end 66 of the channel 64. At least one stop 72 extends from the sloped section 70 of the lower surface 58 of the receiver 52 in the −x rear vehicle-longitudinal direction of the coordinate axes opposite the open front end 66. As shown, in some embodiments, a plurality of stops 72 extend in the −x rearward vehicle-longitudinal direction. A locking pin 74 extends in the −z downward vehicle-vertical direction from the lower surface 58 of the receiver 52 rearward of the at least one stop 72. As discussed in more detail herein, the locking pin 74 extends through the locking aperture 48 of the center stay 30 when the seat 68 of the receiver 52 is seated on the ledge 46 of the center stay 30. Therefore, the locking pin 74 is dimensioned similar to that of the locking aperture 48. As such, the locking pin 74 and the locking aperture 48 may each have a similar or corresponding cross-section such as, for example, a square cross-section or a circular cross-section. Alternatively, the cross-sections of the locking pin 74 and the locking aperture 48 may differ, but may include a locking mechanism. In some embodiments, the locking pin 74 includes at least one flange 76 extending from a side of the locking pin 74 to retain the locking pin 74 in position with respect to the locking aperture 48 when inserted therein. The flange 76 may be flexible to permit manual removal of the locking pin 74 from the locking aperture 48 if necessary.

As noted above, the center stay support 32 includes the arm 54, which is fixed to the receiver 52 and extends in the −x rearward vehicle-longitudinal direction from the receiver 52. The arm 54 is an elongated member having a forward end 78 and a rear end 80. The arm 54 includes an anti-rotation pin 82 extending in the +/−y vehicle-lateral direction proximate the rear end 80 of the arm 54. The anti-rotation pin 82 is configured to extend through and engage the anti-rotation aperture 50 formed in the center stay 30, as shown in FIG. 1. Thus, the anti-rotation pin 82 extends in a direction substantially perpendicular to the direction in which the locking pin 74 extends.

In some embodiments, the center stay support 32 extends from the second side wall 62 of the center stay support 32 and the anti-rotation pin 82 extends in the −y vehicle-lateral direction of the coordinate axes. Alternatively, in some embodiments, the center stay support 32 extends from the first side wall 60 of the center stay support 32 and the anti-rotation pin 82 extends in the +y vehicle-lateral direction. However, the present disclosure is not limited to the above arrangements and it is to be appreciated that other arrangements may be possible such that the anti-rotation pin 82 may be configured to extend in the +/−y vehicle-lateral direction and through the anti-rotation aperture 50 formed in the center stay 30.

The anti-rotation pin 82 is dimensioned similar to that of the anti-rotation aperture 50. As such, the anti-rotation pin 82 and the anti-rotation aperture 50 may each have a similar or corresponding cross-section such as, for example, a square cross-section or a circular cross-section. Alternatively, the cross-sections of the anti-rotation pin 82 and the anti-rotation aperture 50 may differ, but may include a locking mechanism similar to that of the locking pin 74. In some embodiments, as shown, the anti-rotation pin 82 has a plus-shaped cross-section that tapers inwardly as the anti-rotation pin 82 extends further from the arm 54.

The center stay support 32 may be formed of any suitable material, such as metal, plastic, polymer composites, or the like. In some embodiments, the center stay support 32 is a one-piece, monolithic structure. Thus, the center stay support 32 may be formed in any suitable manner, such as casting, injection molding, or the like.

In use, with the center stay 30 mounted to the radiator support beam 26, the center stay support 32 is secured to the center stay 30 by inserting the anti-rotation pin 82 of the center stay support 32 into the anti-rotation aperture 50 of the center stay 30. Thereafter, the center stay support 32 may be rotated downward about the y-axis or positioned such that the seat 68 of the receiver 52 of the center stay support 32 abuts against the ledge 46 of the center stay 30 to be seated thereon. In doing so, the locking pin 74 of the center stay support 32 may be inserted into the locking aperture 48 of the center stay 30. Lastly, the bumper attachment member 20, which is fixed to the bumper 12 at the forward end 22 thereof, engages the center stay support 32. Specifically, the rear end 24 of the bumper attachment member 20 opposite the bumper 12 may be inserted into the open front end 66 of the receiver 52 of the center stay support 32 and locked into position therewith, as discussed above.

Alternatively, the center stay support 32 may be attached to the center stay 30 by initially positioning the seat 68 of the center stay support 32 atop the ledge 46 of the center stay 30 and aligning the locking pin 74 of the receiver 52 with the locking aperture 48 formed in the ledge 46 of the center stay 30. The at least one stop 72 provided on the lower surface 58 of the receiver 52 of the center stay support 32 may assist in correctly aligning the locking pin 74 with the locking aperture 48. Once the locking pin 74 engages the locking aperture 48, the center stay support 32 may be rotated about the z-axis such that the anti-rotation pin 82 of the center stay support 32 aligns with and engages the anti-rotation aperture 50 formed in the center stay 30.

It should be appreciated that without the anti-rotation pin 82 of the center stay support 32 engaging the anti-rotation aperture 50 of the center stay 30, the center stay support 32 would be susceptible to rotation at the locking pin 74 of the center stay support 32 about the y-axis due to the weight of the bumper 12 on the center stay support 32 and the distance between the bumper 12 and its connection with the center stay 30, i.e., the locking pin 74. Over time, gravity applying a downward force onto the bumper 12 and the force being transferred to the center stay support 32 via the bumper attachment member 20 results in the center stay support 32 rotating at the locking pin 74 about the y-axis and, thus, the bumper 12 sagging with respect to the rest of the vehicle 10, particularly the radiator 14. Excessive rotation of the center stay support 32 results in the locking pin 74 of the center stay support 32 disengaging the locking aperture 48 of the center stay 30. Thus, the anti-rotation pin 82 extending in the y-axis and substantially perpendicular to the locking pin 74 strengthens the connection between the center stay support 32 and the center stay 30, thereby inhibiting rotation of the center stay support 32 and, thus, movement of the bumper 12.

From the above, it is to be appreciated that defined herein is a bumper support assembly that couples a bumper of a vehicle to a radiator of the vehicle and inhibits movement, such as sagging, of the bumper with respect to the radiator. The bumper support assembly includes a center stay support, which is coupled to the bumper via a bumper attachment member, including a pair of pins that engage a pair of associated apertures formed in a center stay, which is coupled to the radiator via a radiator support beam.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a bumper attachment member;
   a radiator support beam; and
   a bumper support assembly coupled to the bumper attachment member and the radiator support beam, the bumper support assembly comprising:
   a center stay fixed to the radiator support beam; and
   a center stay support having a receiver, an arm, and an anti-rotation pin, the arm extends in a vehicle-longitudinal direction from the receiver, the receiver configured to receive and engage the bumper attachment member, the anti-rotation pin extends in a vehicle-lateral direction proximate an end of the arm opposite the receiver and engages the center stay to inhibit movement of the bumper attachment member with respect to the radiator support beam.

2. The vehicle of claim 1, wherein the receiver defines a channel for receiving an end of the bumper attachment member, an opposite end of the bumper attachment member being fixed to a bumper.

3. The vehicle of claim 1, wherein the center stay includes a ledge and the receiver of the center stay support has a seat, the seat abutting against the ledge to inhibit movement of the bumper attachment member in the vehicle-vertical direction with respect to the radiator support beam.

4. The vehicle of claim 3, wherein the anti-rotation pin extends through an anti-rotation aperture formed in the center stay.

5. The vehicle of claim 4, wherein the center stay support includes a locking pin extending from the seat and extending through a locking aperture formed in the ledge of the center stay.

6. The vehicle of claim 5, wherein the anti-rotation pin includes a plus-shaped cross-section.

7. The vehicle of claim 5, wherein the center stay has a rear end coupled to the radiator support beam and a forward end opposite the radiator support beam, the anti-rotation aperture formed proximate the rear end of the center stay and the locking aperture formed proximate the forward end of the center stay.

8. The vehicle of claim 6, wherein the anti-rotation aperture and the locking aperture have a cross-section corresponding to the anti-rotation pin and the locking pin, respectively.

9. The vehicle of claim 1, wherein the receiver, the arm, and the anti-rotation pin are formed as a one-piece, monolithic structure.

10. The vehicle of claim 5, wherein the locking pin extends in a vehicle-vertical direction.

11. The vehicle of claim 10, wherein the anti-rotation pin extends in a direction perpendicular to a direction in which the locking pin extends.

* * * * *